E. A. HILDING.
AIR VALVE FOR PNEUMATIC TIRES.
APPLICATION FILED SEPT. 12, 1916.
1,212,641. Patented Jan. 16, 1917.
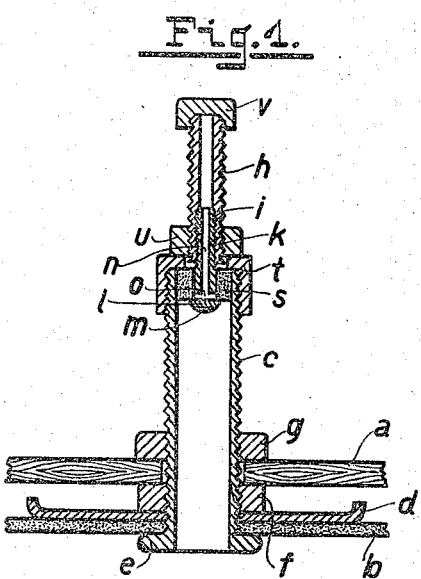
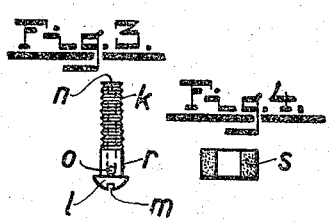
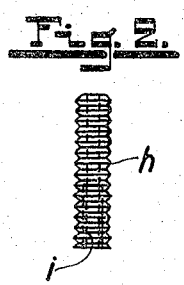
INVENTOR,
Ernst Alfred Hilding
By Wm Wallace White
ATTY

UNITED STATES PATENT OFFICE.

ERNST ALFRED HILDING, OF LIDKÖPING, SWEDEN, ASSIGNOR TO AKTIEBOLAGET SVENSKA LUFTVENTILER, OF LIDKÖPING, SWEDEN.

AIR-VALVE FOR PNEUMATIC TIRES.

1,212,641.      Specification of Letters Patent.      Patented Jan. 16, 1917.

Application filed September 12, 1916. Serial No. 119,624.

*To all whom it may concern:*

Be it known that I, ERNST ALFRED HILDING, a subject of the King of Sweden, residing at Lidköping, in the county of Skaraborg and Kingdom of Sweden, have invented new and useful Improvements in and Relating to Air-Valves for Pneumatic Tires, of which the following is a specification.

This invention refers to improvements in air valves for pneumatic tires and is especially adapted to be used in connection with such tires for bicycles or similar small cars. For larger cars, as common automobiles this improved valve can, of course, be used also but preferably another type of my improved valve may be applied in connection with the wheels of such cars, for instance the valve described in my application filed simultaneously with this one on September 12th, 1916, and bearing the Serial Number 119,623. In my earlier patent application filed Aug. 11, 1915, and bearing the Serial Number 44873 there is described an improved air valve for similar purposes which valve, however, in practice has proved itself not to answer all the demands made upon it, especially because the tightening washer is positioned inside the tire and thus cannot be reached for inspection and replacing of the washer if necessary without removing the entire body of the valve.

The object of this invention is to provide an air valve which, in agreement with the device shown in the earlier patent application mentioned, dispenses with the common rubber tube tightening implement and replaces this rather inconvenient element by a simple washer of rubber or some other suitable soft material, such as leather or the like. Differing from the earlier invention referred to, this improved valve carries its tightening washer inside a loosely fitted cap, which can be easily unscrewed and the washer inspected and renewed if necessary.

Another object of this invention is to provide an air valve containing the feature mentioned, which comprises such simple elements that it can be manufactured in a much cheaper way than similar valves hitherto known, and, as a consequence thereof can be repaired, by the most inexperienced mechanic.

Other features of the improved valve will be clearly understood from the description below.

In the accompanying drawing the improved valve is illustrated on a rather enlarged scale to clearly demonstrate the parts, though it may in practice be manufactured not larger than the common bicycle air valves.

Figure 1 of the drawing shows a longitudinal section of the air valve in position for ordinary use. Fig. 2 an elevation of the outer pipe. Fig. 3 an elevation of the washer holder and Fig. 4 a longitudinal section through the washer itself.

$a$ is a portion of the wheel rim, $b$ the nearest portion of the wall of the pneumatic tire, $c$ the outer sleeve of the valve fastened to the tire $b$ in a common manner by means of a plate $d$, flange $e$ and nut $f$. The nut $g$ keeps the valve sleeve $c$ in position against the wheel rim $a$ as usual. A pipe $h$ with outside threads along its entire length is in its lower portion provided also with inside threads $i$ and carries therein a screw $k$ with head $l$. By means of a common screw driver and a slot $m$ in the head $l$ this screw can easily be fitted or unscrewed when wanted. Nearly the entire length of screw $k$ is provided with a central bore $n$ which rather close to the head $l$ communicates with one or more lateral openings $o$ (in Fig. 1 there are shown two such lateral openings $o$ in straight line, though they can of course run in any other directions approximately radially to the axis of screw $k$.) The screw $k$ may be threaded the entire length, but I prefer to leave the portion $r$ adjacent to the head $l$ smooth.

Between the head $l$ and the adjacent end of pipe $h$ the valve is provided with a washer $s$ of rubber or some other soft material which may be secured in position by adjusting the screw $k$ relatively to the end of pipe *h*. The washer *s* I make of such a diameter that it closely fills up the bore of the sleeve *c* when the valve is mounted, and simultaneously the washer covers the lateral openings *o* by its inner wall. A cap nut *t* together with the nut *u* secures the pipe *h* with screw *k* and washer *s* in position in the sleeve *c* whereby the washer *s* fits also against the bottom of the cap nut *t* as clearly visible in Fig. 1. By means of a nut *u* the pipe *h* can be screwed outward with respect to sleeve *c*, thereby causing the washer *s* to be compressed between head *l* and the inner surface of cap screw *t* and simultaneously pressed against the inner walls of the bore in sleeve *c*.

A screw cap *v* covers as usual the bore in pipe *h*.

When inflating the tire the air from the common pneumatic tire air pump injected through the pipe *h* and bore in screw *k* will act upon the inner wall of washer *s* through the orifices *o*, thereby causing the washer to yield sufficiently to allow the air to enter the tire through the sleeve *c*. If tightened too much to allow the air to pass by, the washer can be released by unscrewing the nut *u* a little. To deflate the tire the nut *u* is unscrewed so far that the pipe *h* with screw *k* can be pushed inward until the orifices *o* arrive beyond the inner surface of the washer *s* which will then no longer prevent the air inside the tire from escaping through the orifices *o* and the bores in the screw *k* and pipe *h*.

If it is desired to renew the washer *s* it is only necessary to slacken the nut *u*, unscrew the cap nut *t* from sleeve *c*, remove the portions *h, k, s* and unscrew the screw *k* from the pipe *h*, and the washer *s* can conveniently be removed from the screw *k* and a fresh washer fitted.

Having thus described my said invention and how it is to be performed what I claim as new and desire to secure by Letters Patent is:

1. An air valve for pneumatic tires comprising an outer sleeve attached to and leading from within the tire, an air supply pipe, means for attaching said air supply pipe to the outer sleeve, a member having a longitudinal bore closed at its inner end attached to the air supply pipe so as to form by means of the bore an extension of the air passage of said air supply pipe, the said member having lateral orifices diverging from the bore thereof, a head on said member adjacent said lateral orifices, an elastic washer positioned about said member so as to cover the lateral orifices therein and to bear against the head of the said member, and the inside of said means for attaching the air supply pipe, and a lock nut about the air supply pipe bearing against the said attaching means so as to compress the elastic washer between the bottom thereof and the said head.

2. An air valve for pneumatic tires comprising an outer sleeve attached to and leading from within the tire, an air supply pipe, a member having a longitudinal bore closed at its inner end loosely attached to the air supply pipe so as to form by means of the bore an extension of the air passage of said air supply pipe, the said member having lateral orifices diverging from the bore thereof, a head on said member adjacent said lateral orifices, an elastic washer positioned about said member so as to cover the lateral orifices therein and to bear against the head of said member, a cap nut closing the bore in the outer sleeve outside the air supply pipe to which said air supply pipe is attached, said cap nut having an annular bottom which serves as the rear seating for said elastic washer and a lock nut about the air supply pipe bearing against the said cap nut so as to compress the elastic washer between the bottom of the cap nut and the said head.

3. An air valve for pneumatic tires comprising an outer sleeve attached to and leading from within the tire, an air supply pipe, a member having a longitudinal bore closed at its inner end, screwed within the inner end of the air supply pipe so as to form by means of the bore an extension of the air passage of said air supply pipe, said member having lateral orifices diverging from the said bore, a head on said member adjacent said lateral orifices, an elastic washer positioned about said member so as to cover the lateral orifices therein and to bear against the head of the said member, a cap nut closing the bore in the outer sleeve outside the air supply pipe, said cap nut having an annular bottom which serves as the rear seating for said elastic washer, and a lock nut about the air supply pipe bearing against the said cap nut so as to compress the elastic washer between the bottom of the cap nut and the said head.

4. An air valve for pneumatic tires comprising an outer sleeve attached to and leading from within the tire, an air supply pipe, a member having a longitudinal bore closed at its inner end attached to the air supply pipe so as to form by means of the bore an extension of the air passage of said air supply pipe, said member having lateral orifices diverging from the said bore, a head on said member adjacent said lateral orifices, an elastic washer positioned about said member so as to cover the lateral orifices therein and to bear against the head of the said member and the inner walls of the said outer sleeve, a cap nut closing the bore in the outer sleeve outside the air supply pipe, said cap nut having an annular bottom which serves as the rear seating for said elastic washer, and a lock nut about the air supply pipe bearing against the said cap nut so as to compress the elastic washer between the bottom of the cap nut and the said head.

In testimony whereof I have affixed my signature in presence of two witnesses.

ERNST ALFRED HILDING.

Witnesses:
  ADOLF MOLIN,
  EINAR JANSON.

Copies of this patent may be obtained for five cents each, by addressing the "Commissioner of Patents, Washington, D. C."